United States Patent Office 3,467,633
Patented Sept. 16, 1969

---

3,467,633
ALPHA-OLEFIN, NON-CONJUGATED ALIPHATIC DIENE, 2 - NORBORNENE (MONO - UNSATURATED) TERPOLYMER COMPOSITIONS AND METHOD OF TACKING WITH SAME
Alexander Thomas Harris, Wilmington, and Kenneth Francis King, Hockessin, Del., assignors to E. I. du Pont de Nemours and Company, Wilmington, Del., a corporation of Delaware
No Drawing. Filed Oct. 11, 1965, Ser. No. 494,939
Int. Cl. C08f 17/00
U.S. Cl. 260—80.78    13 Claims

ABSTRACT OF THE DISCLOSURE

Alpha-olefin, non-conjugated aliphatic diene, 2-norbornene (mono-unsaturated) terpolymer composition and the method of tacking uncured elastomeric articles of sulfur-curable alpha-olefin copolymers with same.

---

The tire industry consumes by far the largest tonnage of all elastomers. The new, α-olefin based elastomers, and particularly the copolymers containing cure-site monomers to permit vulcanization by conventional techniques, such as the so-called EPT elastomers, are strong candidates for use in automotive tires. Heretofore the use of these materials for automotive tires has been prevented by lack of adequate building tack. Building tack is the property of two elastomeric surfaces to stick together when contacted.

A new class of olefin copolymers has now been discovered which have excellent building tack. The gum vulcanizates also possess outstanding physical properties. In addition, these copolymers can be employed to impart building tack to other olefin copolymers which are deficient in that property, but otherwise useful for the manufacture of composite articles such as automobile tires.

Broadly, the compositions of the present invention are linear statistical copolymers of (I) From 30 to 45 weight percent of units having the formula:

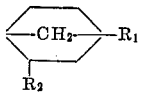

said units being derived from a norbornene having the formula:

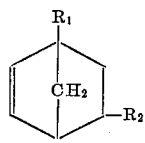

wherein $R_1$ and $R_2$ are hydrogen or alkyl groups having from 1 to 4 carbon atoms.

(II) From 2 to 15% by weight of unsaturated units derived from a non-conjugated aliphatic diene having at least one double bond which is polymerizable with an anionic catalyst.

(III) The balance of said copolymers being units derived from a straight chain α-olefin having from 2 to 4 carbon atoms, and optionally minor amounts of other polymerizable α-olefins having from 5 to 18 carbon atoms.

The copolymers of the present invention have an inherent viscosity measured on a 0.1% by weight solution in tetrachloroethylene at 30° C. of from 0.5 to 2.0. It is critical that the inherent viscosity should be in the above range to develop good tack properties as is shown in the examples.

The major component of the copolymers of the present invention is a straight chain α-olefin having from 2 to 4 carbon atoms. Ethylene is strongly preferred since it is inexpensive, available in large quantities, and provides high copolymerization rates, all of which are desirable from a commercial viewpoint. Propylene and butene-1 are also readily available and relatively inexpensive. Minor amounts of other α-olefins may be incorporated in the copolymers.

This invention also provides a method for tacking uncured compound elastomeric articles of sulfur curable α-olefin copolymers to each other, which comprises applying a coating of a mixture of a copolymer of the present invention together with compounding ingredients intimately dispersed or dissolved in an inert organic solvent for the copolymer to each of the surfaces of the articles which are to be tacked, drying the coating, then contacting the coated surfaces of the articles to each other.

The copolymers of the present invention are compounded with compounding ingredients equivalent to those employed in compounding the articles to be adhered. The mixture of the compounded copolymer with the solvent should contain from 5 to 50% by weight and preferably 5–15% by weight of total non-volatile ingredients and should be applied in an amount sufficient to coat each article preferably with from 5 to 35 milligrams of the compounded copolymers per sq. inch of surface.

The norbornenes, which are represented by the formula:

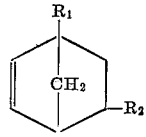

wherein $R_1$ and $R_2$ are independently either hydrogen or an alkyl group having from 1 to 4 carbon atoms are known compounds and can be made by the Diels-Alder reaction of cyclopentadiene or a substituted cyclopentadiene with an α-olefin.

The concentration of norbornene in the copolymers is critical to obtain excellent building tack properties. The optimum concentration is about 40% by weight, but concentrations of from 30% to 45% by weight provide improved building tack properties.

The cure-site monomer is also an essential ingredient. One class of cure-site monomers is non-conjugated aliphatic dienes having from 6 to 22 carbon atoms and at least one terminal double bond. These compounds have the formula:

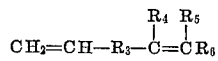

wherein $R_3$ is an alkylene radical and $R_4$ $R_5$ and $R_6$ are independently selected from hydrogen or alkyl radicals. The preferred species is 1,4-hexadiene.

Other cure-site monomers that can be employed in the practice of this invention include cyclic aliphatic non-conjugated dienes such as dicyclopentadiene, 5-methylene-2-norbornene, 5-alkenyl-2-norbornenes, 2-alkyl-2,5-norbornadienes and cyclooctadienes.

The concentration of diene can be varied to provide differing vulcanization properties to suit any particular application. Generally the double bond content of the copolymer, which is substantially derived from the diene component should be at least 0.1 gram-mole/kilogram of copolymer. The required double bond content depends inversely on the molecular weight of the copolymer i.e., high molecular weight copolymers require a lesser degree degree of unsaturation for equivalent vulcanization performance. The usual range of diene content is sufficient to provide from 2 to 15 weight percent of unsaturated units in the copolymer.

The copolymers of the present invention are essentially linear i.e., the monomer units are incorporated into the molecules as bivalent units. They are saturated in the principal chain of the polymer i.e., the norbornene units are incorporated in the form:

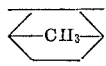

The copolymers of the present invention can also be described as statistical copolymers, that is copolymers made by employing a reaction medium containing at all times all of the monomer species which are to be incorporated in the copolymer. In contrast block copolymer or graft copolymers (according to present technology) are made by reacting only one or part of the various monomer species at any one time.

The distribution of the various monomer units in the copolymers of the present invention is not known precisely, but it is believed that the norbornene units tend to be isolated from each other by at least one other monomer unit, when made by the process described hereinafter.

The copolymers of the present invention can be made by contacting the monomers with certain coordination catalysts, preferably in the presence of an inert organic solvent for the resulting polymer such as tetrachloroethylene.

The preferred catalysts consist of the reaction product: (1) a vanadium compound such as vanadium tris(acetyl acetonate), vanadium oxybis(acetylacetonate), vanadium tetrachloride, trialkylorthovanadates (such as triethylorthovanadate, triisobutylorthovanadate and tris(p-chlorophenyl orthovanadate) and (2) an organo metallic reducing agent, particularly organoaluminum compounds of which the diorganoaluminum chlorides are preferred. One of the catalyst components should contain halogen, preferably chlorine, unless the halogen is supplied by the reaction medium.

Coordination catalysts based on titanium compounds tend to rearrange the norbornene component to produce monomer units having the formula:

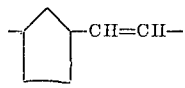

thus leading to unsaturation in the principal chain of the polymer which is undesirable since it permits degradation of the polymer by oxidation. The tendency can be at least partially suppressed by formation of the coordination catalyst in the presence of the monomers.

As is understood by those skilled in the art, the relative proportions of the reducing agent and the transition metal component needed to gain an active catalyst depend upon the particular combination in hand. Thus in the case of vanadium tris(acetylacetonate) and diisobutyl aluminum monochloride one should use at least about 4 molar proportions of the aluminum compound for every molar proportion of the vanadium one. In the case of the combination diisobutyl aluminum monochloride and vanadium oxytrichloride, a smaller proportion, such as 2:1, is entirely adequate. The best relative proportions can be selected by routine experimentation. The preferred concentration of the transition metal compound in the copolymerization reaction zone can be selected by those skilled in the art to suit the purpose at hand; preferred concentration of vanadium compounds frequently are in the range of about 0.0005 to 0.005 mole/liter; however, higher or lower concentrations can be employed.

The catalyst can be formed by mixing the components ahead of the polymerization zone or it may be formed there in situ.

The inert diluent can act as a solvent for the polymer formed or it may merely swell the product as in the case of slurry polymerization. Typical liquid media include tetrachloroethylene, cycloparaffins such as cyclohexane, fluorochloro-substituted liquid paraffins such as trichloromonofluoromethane, liquid aromatic hydrocarbons such as benzene, and chlorinated alkanes such as methylene chloride.

In order to prepare statistical copolymers, that is—copolymers whose monomer units are incorporated with a statistical distribution, the reaction zone is supplied at all times with all the monomers to be incorporated in the copolymer. The concentration of monomers can be controlled by conventional methods. Thus when the reaction vessel is liquid full and has no free vapor space, the concentrations are controlled merely by supplying the appropriate quantity of the monomers to a given volume of the reaction system. When the reactor has a vapor space, the monomer concentrations are controlled by their partial pressure in the vapor space and by the reaction temperature. In accordance with Henry's law, at constant temperature the concentration of a gaseous monomer in the reaction medium is proportional to its partial pressure in the vapor space. Those skilled in the art can use the Henry's law constants for the particular monomer in the reaction medium as the basis for maintaining the appropriate monomer partial pressure. Gaseous diluents such as nitrogen can be employed when needed to reduce the partial pressure of a monomer.

The molecular weight of the copolymer can be controlled by the addition of hydrogen to the reaction mixture.

After the appropriate time the catalyst can be deactivated by known procedures, such as by addition of a low molecular weight alcohol to the reaction mass. Catalyst residues can be extracted in the known manner as with dilute acids, such as acetic or hydrochloric acid. The copolymer products can be isolated from solution either by precipitation with a non-solvent or by removal of the solvent by evaporative distillation or drum drying. Alternatively, the copolymer solution can be emulsified with water and the liquid organic portion stripped with steam. When the copolymer is prepared in slurry form, it can be separated from the major portion of the reaction medium by conventional mechanical means such as filtration or centrifugation. The remaining solvent can be removed by such means as an extruder or an air drier.

The nature of the compositions of this invention will be appreciated by a discussion of the properties of ethylene/norbornene/1,4-hexadiene tripolymers which are a preferred embodiment of this invention.

Ethylene/norbornene/1,4-hexadiene tripolymers in the raw uncured state are tough elastomeric materials exhibiting a brittle point in the vicinity of $-60°$ C. Other factors being constant, the glass transition temperature tends to rise as the norbornene content in the copolymer is increased; for example, $-16°$ C. for a copolymer having 26.8 weight percent norbornene and 3.7% hexadiene, $-13°$ C. when the norbornene content was 35%, and $+20°$ C. when the norbornene content was 46.5%. Other factors being constant, the modulus and tensile strength of the copolymer tend to go through a minimum as the norbornene content is increased: 2,325 p.s.i. for a 26.8% norbornene copolymer, 825 p.s.i. for a 35% norbornene copolymer and 2,000 p.s.i. for a 46.5% norbornene copolymer. Surprisingly, although the unvulcanized gums of the present invention are weak in the uncured state, the gum vulcanizates have exhibited outstanding tensile strengths, and have had excellent tensile set values, as is shown in the data of Table III in the accompanying examples.

The ethylene/norbornene/1,4-hexadiene tripolymers having about 3–4% hexadiene content exhibit good compression set behavior, the method B values (22 hrs. at 77° C.) have been frequently in the range of about 10–18%. The shore A hardness has ranged from about 53–98; in this case, other factors being held constant, the values have tended to go to a minimum with increasing norbornene content.

The copolymers of the present invention can be compounded with any of the carbon blacks, mineral fillers, pigments, extending oils, and plasticizers familiar to those skilled in the elastomer art. The copolymers are preferably preheated at about 100° C. for compounding.

The reinforcing furnace and channel process carbon blacks are preferred when making a high modulus stock. Representative examples of reinforcing blacks include SAF, ISAF, and HAF carbon blacks, particularly the high-structure types. Other furnace blacks such as SRF, HFM, CF and FF can also be used satisfactorily. Stocks containing channel black are slightly slower curing. Typical channel blacks include EPC, MPC, HPC and CC. Thermal carbon blacks are suitable but provide a lower order of reinforcement than given by furnace or channel blacks.

A wide variety of mineral fillers are suitable. Representative examples include kaolin clay, calcined kaolin clay, chemically treated calcined kaolin clay, blanc fixe (precipitated barium sulfate), titanium dioxide, zinc oxide, magnesium silicate, silica, esterified silica, fine particle talc and whiting. Kaolin clays will reinforce the copolymers better than calcined kaolins will. Mixtures of mineral fillers can be employed. If desired, both mineral fillers and carbon black can be used.

Although it is not necessary for obtaining the benefits provided by the present invention, a petroleum oil is usually included in the present composition in order to lower the materials costs and to improve processing. Any of the petroleum oils commonly used in the trade can be employed, although it is preferred to use the naphthenic or the paraffinic types. The petroleum oil concentration can range from about 5 to 200 parts for every 100 parts by weight of the hydrocarbon polymer. The proportion of oil can be selected by routine experimentation to suit the needs and economics of a particular application.

When the polymers of the present invention are employed to impart tack to elastomeric, curable, α-olefinic copolymers which are deficient in that property, they will generally be compounded with the same or similar ingredients to those employed in compounding the $a$-olefin copolymers.

Thus, when the base α-olefin copolymers contain sulfur as a curing agent, the coating copolymers of the present invention will be compounded with sulfur. When resin or peroxide curing agents are employed for the base copolymer, the coating copolymer will likewise be compounded with the same resin or peroxide curing agent. Other compounding ingredients are less critical, but it is generally preferred to compound the coating copolymer with essentially the same ingredients as the base copolymer.

The copolymers of the present invention have side-chain carbon-carbon double bonds and, accordingly, can be cured with sulfur in the conventional manner or with resins.

Procedures for sulfur curing elastomers are described in: Encyclopedia of Chemical Technology, Kirk and Othmer, published by Inter-Science Encyclopedia, Inc., New York, 1953, 11, pp. 892–927; Principles of High-Polymer Theory and Practice, Schmidt and Marlies, published by McGraw-Hill Book Co., New York, 1948, pp. 556–566; Chemistry and Technology of Rubber, Davis and Blake, published by Reinhold Publishing Corp, New York, 1937, chapter 6; Introduction to Rubber Technology, edited by M. Morton, Reinhold Publishing Corp., New York, 1959, pp. 93–129; The Applied Science of Rubber, edited by W. J. S. Naunton, Edward Arnold Ltd., London, 1961, pp. 346–413, 992–1099. Typical procedures are illustrated in the examples.

In place of sulfur curing, one may employ the so-called resin system. In general this involves the use of a methylol phenol, preferably in combination with a metal halide activator and/or zinc oxide. The most effective concentration of resin are in the neighborhood of 8–12 parts (per 100 of copolymer by weight), although as little as 6 can be used. The metal halide proportions are typically 2–4 phr. A typical effective zinc oxide concentration is 5 phr. The best concentration in each case will depend on the diene concentration of the copolymer, the rubber formulation and the curing conditions.

The heat reactive phenol-aldehyde resins are more particularly described in Phenolplasts: Their Structure, Properties, and Chemical Technology, T. S. Carswell, vol. VIII of High Polymers, Interscience Publishers, Inc., New York, pp. 6–73, 204–207; W. A. Pardee and W. Weinrich, Ind. Eng. Chem. 36, 595–603 (1944); E. C. Britton, Ind. Eng. Chem. 33, 965 (1941); V. H. Turkington and I. Allen, Ind. Eng. Chem. 33, 966–971 (1941); U.S. Patents, 1,996,069; 2,364,192; 2,963,462 and 2,972,600.

Representative examples of resins, are sold under the trade names: Resin SP-1055, Amberol ST-137 and Resin SP-1045. The first is an oil-soluble, heat-reactive bromomethyl alkylated phenol/formaldehyde having a specific gravity of 1.00–1.10, a melting point of 125–145° C., a bromine content of 3.6–3.9%, by weight, and a methylol content of 10.0–12.5% by weight. It may be prepared by reacting a p-tert-$C_8$ alkyl phenol/formaldehyde with hydrogen bromide in accordance with the general procedure described in Example 5 of U.S. Patent 2,972,600. The second, sold under the trade name Amberol ST-137 X which has terminal methylol groups, is believed to be made by condensing formaldehyde under basic conditions with

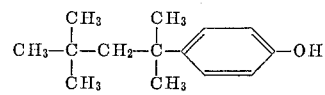

Some of the bridges between the rings are —$CH_2$— groups, others are —$CH_2$—O—$CH_2$— groups. The third resin, sold under the trade name Resin SP-1045, is a heat-reactive, oil-soluble phenol-formaldehyde resin having a specific gravity of 1.00–1.10 and a melting point of 140–160° F. It may be prepared by reacting one mole of a p-tert-$C_4$–$C_8$ alkyl phenol with 2 moles of formaldehyde at about 70° C. in the presence of one mole of sodium hydroxide, neutralizing the resin-containing mixture, and separating the resin. Although the copolymers can be cured with the resins alone, it is preferred to use an activator. Zinc oxide itself is suitable and is preferred for economic reasons. Alternatively metal halide activators can be employed. Typical activators, grouped in approximate order of increasing effectiveness, include:

Curing temperatures for the sulfur curing systems generally range between about 130 and 160° C. with about 150 to 160° C. being preferred. Cure times are generally between about 15 and 45 minutes. For the resin curing system temperatures of about 160 to 200° C. are generally employed.

The copolymers of the present invention are not only valuable for the preparation of a wide variety of useful articles, but they exhibit outstanding ability to improve the building tack of backbone-saturated α-olefin hydrocarbon elastomers when coated thereon.

The chain-saturated hydrocarbon polymers which are coated with the novel copolymer are made from an α-monoolefin, preferably ethylene, and at least one other α-monoolefin or a non-conjugated diene or a mixture thereof. The α-monoolefins are those having the structure R—CH=$CH_2$ where R is H or $C_1$–$C_{16}$ alkyl, preferably straight-chained. Representative dienes include: open-chain $C_6$–$C_{22}$ dienes having the structures

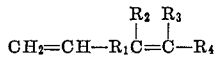

wherein $R_1$ is an alkylene radical, $R_2$, $R_3$, and $R_4$ are independently selected from the group consisting of hydrogen and alkyl radicals; dicyclopentadiene; 5-methylene-2-norbornene; 5-alkenyl-2-norbornenes; 2-alkyl-2,5-norbornadienes; cyclopentadiene; and 1,5-cyclooctadiene.

Representative procedures for making copolymers using these α-monoolefins and typical dienes are given in U.S. Patents 2,933,480; 3,000,866; 3,063,973; 3,093,620 and 3,093,621.

The hydrocarbon copolymers being coated are compounded ahead of time with appropriate curing agents. Copolymers made entirely from alpha-monoolefins can be cured with peroxide in the usual manner for essentially saturated hydrocarbon polymers. The copolymers made from at least one alpha-monoolefin and at least one non-conjugated diene can be compounded with any of the conventional sulfur, resin, or even peroxide curing systems. Representative references on curing include: The Applied Science of Rubber, edited by W. J. Naunton, Edward Arnold Ltd., London, 196; Synthetic Rubber Technology, vol. I. W. S. Penn, MacLaren & Sons, Ltd., London, 1960; and Vulcanization of Elastomers, G. Alliger and I. J. Sjothum, Reinhold Publishing Corp., New York, 1954.

The polymer being coated is also generally compounded with curing agents, conventional fillers (black or mineral or mixtures thereof), pigments, plasticizers, and extending oils prior to the coating operation itself.

The compounded copolymer of the present invention is applied as a thin coating in an uncured condition on the surface of the substrate α-olefin elastomer displaying poor tack. It is preferred to coat the substrate with a solution of the novel copolymer in an inert organic solvent and then remove the solvent. Tetrachloroethylene, cyclohexane, toluene, methyl chloroform, and benzene are examples of good solvents. The amount of inert organic liquid can vary over a wide range and is largely determined by the particular requirements for each application. Preferably, the total concentration of compounded copolymers ranges from about 5 to 50% by weight, with 5–15% being particularly preferred, i.e., the concentration is calculated on the basis of the weight of the novel copolymer and any nonvolatile components, such as carbon black and processing oil accompanying it.

The liquid coating is applied in the conventional manner familiar to those skilled in the adhesive art; brushing, rolling, spraying, swabbing, dipping, knife coating, and the like can be employed to spread the adhesive across the surface of the α-olefin copolymer substrate. The thickness of the coating is dictated largely by economic consideration. The dry thickness of a particular coating applied from a liquid carrier will be somewhat a function of the solids content of the composition supplied; it is generally preferred that the amount of the coating composition applied be sufficient to leave a dry coating about 5 milligrams to 10 milligrams for each square inch covered. As said before, greater thicknesses can be employed but are not as economical; thicknesses over 35 milligrams/sq. in., are usually not needed. Thicknesses less than 5 milligrams/sq. in. may leave an insufficient amount of composition to achieve the best results in some applications.

Once the coating has been applied, the liquid carrier (e.g. volatile solvent) is removed by evaporation. About 30–120 minutes may be required at 25–30° C.; higher temperatures will shorten the time but should not be sufficient to cause appreciable curing of the coating or the substrate. When carrier free, the coated article is ready for use. In order to obtain the best results, it is desirable to protect the coated surface from contamination by dust, powders, and the like. The coated substrate can then be pressed against another coated substrate; the tacky surfaces remain well fixed.

Prior art procedures can be employed for assembling the composite articles to suit the particular application. The assembly is cured by heating under pressure (typically 50–500 p.s.i.). The curing temperatures for the composite assembly are in the same range as those used for curing the novel copolymers themselves.

In the examples the following analytical and test methods were employed:

ANALYSIS OF COPOLYMER CONTENT

(1) Norbornene content

The weight percent norbornene can be determined conveniently by infrared spectroscopy. The ratio of the base line absorbance of a band at $8.65\mu$ ($A_{8.65\mu}$) that of a band at $2.3\mu$ ($A_{2.3\mu}$) is determined using a base line drawn from $2.95\mu$ to $3.60\mu$ in the case of the $2.3\mu$ band, and a base line drawn from $6.55\mu$ to $10.15\mu$ in the case of $8.65\mu$ band. This ratio has been correlated with the weight percent of norbornene. The correlation will vary somewhat depending on the spectrometer, and the operating conditions under which it is employed. For a Perkin Elmer model 137 infrared spectrometer, the correlation found is shown in Table I.

TABLE I.—ETHYLENE-NORBORNENE-1,4-HEXADIENE TERPOLYMERS. WT. PERCENT NORBORNENE VS. $A_{8.65}/A_{2.3}$ RATIO. PERKIN-ELMER MODEL 137 INFRACORD

| $A_{8.65}/A_{2.3}$ | Wt. percent norbornene | $A_{8.65}/A_{2.3}$ | Wt. percent norbornene |
| --- | --- | --- | --- |
| 1.37 | 30.0 | 1.82 | 39.5 |
| 1.40 | 30.5 | 1.85 | 40.0 |
| 1.41 | 31.0 | 1.88 | 40.5 |
| 1.43 | 31.5 | 1.92 | 41.0 |
| 1.45 | 32.0 | 1.95 | 41.5 |
| 1.47 | 32.5 | 2.00 | 42.0 |
| 1.49 | 33.0 | 2.02 | 42.5 |
| 1.51 | 33.5 | 2.07 | 43.0 |
| 1.54 | 34.0 | 2.10 | 43.5 |
| 1.56 | 34.5 | 2.15 | 44.0 |
| 1.58 | 35.0 | 2.20 | 44.5 |
| 1.60 | 35.5 | 2.25 | 45.0 |
| 1.63 | 36.0 | 2.30 | 45.5 |
| 1.65 | 36.5 | 2.35 | 46.0 |
| 1.67 | 37.0 | 2.40 | 46.5 |
| 1.70 | 37.5 | 2.47 | 47.0 |
| 1.73 | 38.0 | 2.55 | 47.5 |
| 1.76 | 38.5 | 2.62 | 48.0 |
| 1.80 | 39.0 | 2.70 | 48.5 |

(2) 1,4-hexadiene content

The 1,4-hexadiene content can be established from the total unsaturation present in the polymer determined by bromine absorption. In the polymerization process a portion (approximately 25%) of the 1,4-hexadiene enters the polymer in a saturated cyclic form. In calculating the weight percent of unsaturated units derived from 1,4-hexadiene, the cyclized units are neglected.

25 ml. of a solution of 5 ml. bromine in 1 l. carbon tetrachloride is added to a solution of the copolymer in 50 ml. of carbon tetrachloride at 25° C. in an iodine maker flask having a liquid seal head above the stopper. The flask is stoppered and a few ml. of 25% by weight aqueous potassium iodide solution is placed above the stopper in the liquid seal head, and the flask is stored in the dark for two hours at 25° C. The flask is then opened, admitting the potassium iodide solution and an additional quantity of about 25 mls. of 25% by weight potassium iodide solution is introduced. The resulting mixture is titrated to a starch end point with 0.1 N sodium thiosulfate solution (if emulsification of the solvent obscures the end point the procedure is repeated with the addition of 75 ml. of 10% aqueous sodium chloride during the titration). After titration, 5 ml. of aqueous potassium iodate solution containing 25 grams of potassium iodate per liter are added and the mixture is again titrated with 0.1 N sodium thiosulfate to determine the amount of bromine taken up by substitution. A blank is also run by repeating the above procedure without the copolymer. The bromine adding to the carbon-carbon double bond is determined from the expression:

$$C = C(\text{moles/kg.}) = \frac{0.1[B-T-2M+2H]}{2 \times (\text{grams of copolymer})}$$

where
B = ml. of 0.1 N sodium thiosulfate used, the end point, before KIO$_3$ addition of the blank solution.
T = ml. of 0.1 N sodium thiosulfate used to end point before KIO$_3$ addition, of copolymer solution.
M = ml. of 0.1 N sodium thiosulfate added to end point after KIO$_3$ solution introduced into the copolymer solution.
H = ml. of 0.1 N sodium thiosulfate added to end point after KIO$_3$ solution introduced into blank solution.

MEASUREMENT OF TACK

(1) Peel test

Two strips of the elastomer under test ¼" x 6" x 0.08" are laminated by bringing the surfaces to be tested into contact and rolling an 8-lb. cylindrical weight (3" diameter, 4" length) over each side of approximately 2 seconds. This assembly is then delaminated 45 seconds after initial contact by peeling at a rate of 5 in./min. The force $P_1$ required for peel is calculated in pounds per linear inch (p.l.i.). After initial separation the strips are again laminated and the procedure repeated. The force required for second separation $P_2$ is also recorded.

(2) Lift

A ¼" x 6" x 0.08" strip is placed flat on a test bed with the surface to be tested exposed and anchored at one end. Another strip is bent into a loop with the test surface outwards and touched at various points along the flat strip. The distance from the free end at which the strip can be lifted 45° is the lift number. The lift number $L_1$ is found prior to lamination. $L_2$ is the lift number determined after lamination and delamination by the Peel Test, and $L_3$ is the lift number determined after a second lamination and delamination.

(3) Fold

In this test a 1" length of a ¼" strip having a thickness of 0.08" is folded on itself and pressed for 1 second. If no separation of the folded end occurs within five minutes the test is considered positive.

(4) Tack at fast break

This test was devised to simulate as closely as possible the conditions encountered in automatic tire building equipment.

The elastomer samples being tested are cut in 1" x ½" pieces. One piece is placed vertically on the vertical face of a fixed metal block and attached thereto with clips. The other piece is mounted horizontally across a similar block which can be driven into contact with the first block by an air cylinder. When the pieces are contacted, the contact are is 0.25 square inch. The force of contact is measured by the pressure supplied to the air cylinder. The time of contact is determined by a timing mechanism which can be set for an interval of from 0.8 to 15 seconds. The air cylinder is reversed by air at about 100 p.s.i. providing a break time of about 20 milliseconds. The tack is measured as the instantaneous breaking force determined using a load cell transducer having a resistance wire the resistance of which varies with deformation, and a high speed recorder. The contact time, the contact pressure and the breaking force are recorded.

This invention will be better understood from the following illustrative examples which are not however intended to fully delineate the scope thereof.

EXAMPLE 1

A. Preparation of an ethylene/2-nor-bornene/1,4-hexadiene copolymer

A 1-liter glass resin flask was fitted with a glass blade mechanical stirrer, a gas inlet tube, a thermometer, a rubber serum cap, and a gas outlet tube. Nitrogen inflow was started and the flask was flame dried. Then 900 ml. of silica gel-dried tetrachloroethylene, 10 ml. of 1,4-hexadiene, and 0.105 gram (0.0003 gram-mole) of vanadium tris(acetylacetonate) were charged, in turn. Vigorous stirring was continually maintained and the temperature was lowered to 0° C. by application of external cooling with a mixture of acetone and crushed solid carbon dioxide. The resulting solution was then saturated by introducing the following gas mixtures below the liquid surface: ethylene (2 liters/minute), nitrogen (2.5 liters/minute), and hydrogen (0.5 liter/minute). The saturation required about 10 minutes. Then 2.43 ml. of a 7 M solution of norbornene in tetrachloroethylene (supplying 1.6 grams of monomer) was introduced from a dropping tube fitted on the head of the reaction flask. The coordination catalyst was formed in situ and the polymerization was begun by adding 0.44 ml. (0.0023 gram-mole) of diisobutyl aluminum monochloride. The gases were continually supplied at the above-described rates and norbornene was supplied at the rate of 1.8 grams/minute (using the 7 M solution). After the copolymerization reaction had continued for 20 minutes at 0° C., 10 ml. of methyl alcohol were introduced to deactivate the catalyst. Gas inflow was stopped and the copolymer was isolated by pouring the solution into excess methyl alcohol. The precipitated product, successively dried in air for about 16 hours and in a vacuum oven at 80° C., weighed 39 grams and displayed an inherent viscosity of 0.84 (measured on a solution at 30° C. of 0.1 gram of copolymer in 100 grams of tetrachloroethylene). The ethylene/2-norbornene/1,4-hexadiene contained (according to infrared analysis) about 40% by weight norbornene monomer units and (according to bromine absorption) about 0.45 gram-mole of carbon-carbon double bonds/kilogram (corresponding to 2.8 weight percent of unsaturated units derived from 1,4-hexadiene).

Preparation of coating compositions

A 3 weight percent coating composition was prepared by dissolving the above-described ethylene/2-norbornene/1,4-hexadiene copolymer in benzene.

Preparation of EPT Carcass Stock

An α-olefin hydrocarbon elastomer (EPT) was prepared according to the general procedure of U.S. Patent 2,933,480 by copolymerizing ethylene, propylene, and 1,4-hexadiene in tetrachloroethylene in the presence of a diisobutyl aluminum monochloride/vanadium oxytrichloride coordination catalyst. The copolymer exhibited a Mooney viscosity (ML–4/250° F.) of 70 and had the following composition (by weight): 52% ethylene units, 44% propylene units, and 3% of unsaturated units derived from 1,4-hexadiene.

A tire carcass stock, based on the EPT elastomer described above, was prepared by compounding the following ingredients on a rubber roll mill at 75–100° F.:

| Ingredient: | Parts by weight |
|---|---|
| EPT elastomer | 100 |
| HAF carbon black | 80 |
| Naphthenic petroleum oil [1] | 47.5 |
| Stearic acid | 1 |
| Zinc oxide | 5 |
| Sulfur | 1.0 |
| 2-mercaptobenzothiazole | 0.75 |
| Tetramethyl thiuram monosulfide | 1.5 |

[1] The naphthenic petroleum oil had the following characteristics:

| | |
|---|---|
| Flash point °F | 445 |
| N-bases percent | 0 |
| 1st acidaffins do | 1.5 |
| 2d acidaffins do | 28.3 |
| Paraffins do | 70.2 |
| Specific gravity (60/60° F.) | 0.8980 |
| Saybolt viscosity (210° F.) sec | 58 |
| Viscosity-gravity constant | 0.834 |
| Wt. percent aromatic ring carbons | 0 |
| Wt. percent naphthenic ring carbons | 45 |
| Wt. percent paraffinic chain carbons | 55 |

MEASUREMENT OF TACK

The tack specimens were prepared from the EPT carcass stock as follows. A sheet of the carcass stock 3" x 6" x 0.08" was placed between a 3" x 6" piece of polyethylene terephthalate film and a 3" x 6" piece of nylon fabric. The assembly was placed in a plunger mold and pressed for 3 minutes at 70° C. under a pressure of 576 p.s.i. in order to embed the nylon fabric in the surface of the sheet. The assembly was then cut into test strips of suitable size. The polyethylene terephthalate coating was then removed and the freshly exposed surface was coated with the adhesive composition.

The test strips were coated with the adhesive composition above, then dried at 25° C. for 16 hours. The following results were obtained:

| Peel | (P.l.i.) | Lift | | Fold |
|---|---|---|---|---|
| $P_1$ | 2.1 | $L_1$ | 4.0 | Positive. |
| $P_2$ | 1.2 | $L_2$ | 3.5 | |
| | | $L_3$ | 3.0 | |

Similar results can be obtained when the 1,4 hexadiene is replaced by:

Dicyclopentadiene
5-methylene-norbornene
5-butenyl norbornene or
Cyclooctadiene

EXAMPLE 2

An ethylene/2-norbornene/1,4-hexadiene copolymer was prepared according to the procedure given in Example 1, except for the following modifications: the flow rates of nitrogen and hydrogen were 2.8 and 0.5 liter/minute, respectively. The initial concentration of norbornene was 2.5 grams and, further norbornene was added at the rate of 0.8 gram/minute. A 36.4-gram yield of copolymer was obtained exhibiting an inherent viscosity (measured as before) of about 1.52 and analyzing as follows: about 0.44 gram-mole of carbon-carbon double bonds/kilogram (corresponding to 3.69 weight percent of unsaturated units derived from 1,4-hexadiene) and about 40.6 weight percent 2-norbornene monomer units, the remainder being ethylene monomer units.

Two tackifying coating compositions, A and B, were made incorporating the above copolymer. Composition A was prepared by dissolving 100 parts by weight of the copolymer in 1460 parts by weight of benzene and adding compounding ingredients according to the recipe given in Example 1 for the carcass stock, except that the type of carbon black was changed to EPC and the amount was reduced to 15 parts. Composition A had about 7.6% solids by weight. The compounding was done using a standard ball-milling procedure in which glass jars containing a benzene solution of the copolymer, the compounding ingredients, and porcelain balls were agitated on a set of motor-driven rollers at 25° C. for about 16 to 24 hours. Composition B was made by dissolving 100 parts by weight of the copolymer in 1460 parts by weight of benzene.

The tack was measured by the procedure given in Example 1. The following data were obtained:

| Coating composition | Peel | (p.l.i.) | Lift | | | Fold |
|---|---|---|---|---|---|---|
| | $P_1$ | $P_2$ | $L_1$ | $L_2$ | $L_3$ | |
| A | 6.0 | 1.9 | 4.5 | 3.0 | 2.5 | Positive. |
| B | 3.4 | 1.8 | 4.5 | 4.5 | 4.0 | Do. |

EXAMPLES 3–12

A series of ethylene/2-norbornene/1,4-hexadiene copolymers were made in a continuous reactor operated at atmospheric pressure and at 25° C. The catalyst employed was formed in situ from a mixture of vanadium tris (acetylacetonate) with diisobutyl aluminum chloride, the molar ratio of the aluminum compound to the vanadium compound being about 30. The reaction was conducted in tetrachloroethylene solvent and molecular weight was controlled by the addition of hydrogen.

The resultant polymer solutions were treated with 10% aqueous acetic acid solution to remove catalyst residues, the non-aqueous phase was decanted, washed twice with distilled water then dried in a drum drier.

Each of the copolymers prepared by the above procedures was analysed for 1,4-hexadiene content by bromine absorption and for norbornene content by infrared spectroscopy.

Each of the copolymers was compounded on a rubber roll mill according to the following recipe.

| | Parts by weight |
|---|---|
| Copolymer | 100 |
| Stearic acid | 1.0 |
| Zinc oxide | 5 |
| Sulfur | 1.5 |
| Tetramethylthiuram monosulfide | 1.5 |
| Mercaptobenzothiazole | 0.75 |

The compositions were then cured for 60 minutes at 160° C. in a press.

The analytical data for the uncompounded copolymers and physical properties for the uncompounded and compounded copolymers are shown in Table II.

A copolymer made substantially as the copolymer of Example 9, containing 38.5% by weight of norbornene, 3% by weight of unsaturated units derived from 1,4-hexadiene, and ethylene and having an inherent viscosity of 1.03 was compounded with various carbon black formulations and vulcanized. The formulation and the properties of the vulcanizates are shown in Table III.

TABLE II.—ETHYLENE-NORBORNENE-1,4-HEXADIENE TERPOLYMER DIISOBUTYLALUMINUM CHLORIDE/VANADIUM TRI(ACETYLACETONATE) CATALYST, 25° C. TETRACHLOROETHYLENE SOLVENT, CONTINUOUS ATMOSPHERIC REACTOR. GUM VULCANIZATE PROPERTIES. EFFECT OF VARYING NORBORNENE CONTENT

| | Example | | | | | | | | | |
|---|---|---|---|---|---|---|---|---|---|---|
| | 3 | 4 | 5 | 6 | 7 | 8 | 9 | 10 | 11 | 12 |
| Composition, wt. percent: | | | | | | | | | | |
| Norbornene | 26.8 | 34.0 | 35.0 | 36.5 | 46.5 | 48.0 | 38.5 | 40.0 | 41.5 | 44.0 |
| Unsaturated units, wt. percent | 2.7 | 2.8 | 2.8 | 2.8 | 2.6 | 2.5 | 3.0 | 3.0 | 2.4 | 2.4 |
| Ethylene | 69.5 | 62.2 | 61.2 | 60.7 | 50.0 | 48.6 | 57.5 | 56.0 | 55.2 | 52.5 |
| Unsaturation (M/KG) inherent viscosity | 0.34 | 0.35 | 0.35 | 0.35 | 0.32 | 0.31 | 0.37 | 0.37 | 0.30 | 0.30 |

TABLE II—Continued

| | Example | | | | | | | | | |
|---|---|---|---|---|---|---|---|---|---|---|
| | 3 | 4 | 5 | 6 | 7 | 8 | 9 | 10 | 11 | 12 |
| (0.1% in C₂Cl₄ at 30° C.) | 0.93 | 1.01 | 1.00 | 1.09 | 0.91 | 0.96 | 0.97 | 1.06 | 1.12 | 1.19 |
| Wallace plasticity (212° F.) | 9 | 17 | 19 | 25 | 37 | 49 | 22 | 31 | 33 | 36 |
| Vulcanizate properties S/S Instron, 25° C.: | | | | | | | | | | |
| $M_{100}$ | 500 | 225 | 225 | 250 | 1,400 | 2,350 | 150 | 150 | 150 | 225 |
| $M_{200}$ | 675 | 300 | 350 | 350 | 2,500 | 2,100 | 225 | 220 | 275 | 425 |
| $M_{300}$ | 1,000 | 450 | 500 | 525 | 3,700 | 2,800 | 325 | 325 | 500 | 1,850 |
| $M_{400}$ | 2,400 | 950 | 1,000 | 1,150 | | | 650 | 700 | 500 | |
| $T_B$ | 4,250 | 2,500 | 2,500 | 2,500 | 5,300 | 8,200 | 3,000 | 2,800 | 2,500 | 4,600 |
| $E_B$ | 460 | 460 | 460 | 440 | 340 | 340 | 490 | 460 | 420 | 360 |
| Tensile, set, percent | 95 | 20 | 19 | 20 | 25 | 115 | 7 | 5 | 3 | 2 |
| Yield point | | | | | 1,400 | 2,750 | | | | |
| S/S Accrometer 50° C.: | | | | | | | | | | |
| $M_{100}$ | 240 | 180 | 160 | 160 | 160 | 190 | 160 | 190 | 150 | 170 |
| $M_{300}$ | 475 | 325 | 300 | 350 | 325 | 675 | 300 | 375 | 350 | 350 |
| $T_B$ | 1,500 | 475 | 357 | 425 | 725 | 1,500 | 625 | 425 | 450 | 775 |
| $E_B$ | 510 | 350 | 340 | 340 | 390 | 360 | 420 | 340 | 350 | 400 |
| Tensile, set, percent | 81 | 8 | 5 | 3 | 8 | 5 | | 5 | 5 | 5 |
| Comp. set B, percent | | | | | | | | | | |
| 22 hours at 70° C | 24 | 17 | 15 | 13 | 17 | 18 | 13 | 11 | 15 | 10 |
| 70 hours at 100° C | 70 | 73 | 68 | 56 | 64 | 59 | 52 | 56 | 65 | 56 |
| Hardness, Shore A | 81 | 61 | 61 | 63 | 98 | 98 | 53 | 54 | 58 | 71 |
| Hardness, Shore D | | | | | 66 | 74 | | | | |
| Resilience: | | | | | | | | | | |
| Yerzley, 25° C | (¹) | 80 | 79 | 80 | (¹) | | 76 | 72 | 20 | 80 |
| Yerzley, 100° C | 83 | 80 | 79 | 83 | 80 | 80 | 80 | 85 | 79 | 81 |
| Bashore, 25° C | 21 | 25 | 27 | 24 | 63 | 64 | 13 | 7 | 6 | 25 |
| Heat build-up ⅜₁₆″ stroke 20 min. test: | | | | | | | | | | |
| ΔC, mils | 2 | 2 | 1 | 0 | (²) | | 0 | 0 | 1 | 1 |
| ΔT, °C | 51 | 49 | 46 | 42 | (²) | | 45 | 40 | 44 | 41 |
| FCT, °C | 128 | 122 | 119 | 113 | (²) | | 117 | 110 | 119 | 112 |
| Condition of center | (³) | (³) | (³) | (³) | (³) | (³) | (³) | (³) | (³) | (³) |
| Time (min.) to minimum compression | 13 | 16 | 14 | 16 | | | 20 | 20 | 13 | 19 |

¹ Too hard.  ² Too hard to measure.  ³ Dense.

TABLE III.—ETHYLENE-NORBORNENE-1,4-HEXADIENE COPOLYMER. VULCANIZATE DATA. EPC BLACK LOADED COMPOUNDS

| E/NB/1, 4-HD copolymer | 100 | 100 | 100 |
|---|---|---|---|
| Stearic acid | 1 | 1 | 1 |
| ZnO | 5 | 5 | 5 |
| EPC | 50 | 50 | 50 |
| Sulfur | 0.75 | 1.0 | 1.5 |
| Tetramethyl thiuram monosulfide | 1.5 | 1.5 | 1.5 |
| 2-mercaptobenzothiazole | 0.75 | 0.75 | 0.75 |
| Cure: 60 min. at 160° C., S/S Instron, 25° C.: | | | |
| $M_{100}$ | 1,350 | 1,409 | 1,800 |
| $M_{200}$ | 2,700 | 3,150 | 3,650 |
| $T_B$ | 3,300 | 3,750 | 3,650 |
| $E_B$ | 240 | 240 | 200 |
| Tensile set, percent | 10 | 10 | 9 |
| Comp. set B, percent: | | | |
| 22 hrs. at 70° C | 20 | 16 | 17 |
| 70 hrs. at 100° C | 56 | 58 | 66 |
| Hardness, Shore A | 87 | 88 | 88 |
| Resilience: | | | |
| Yerzley, 100° C | 63 | 62 | 62 |
| Bashore, 25° C | 8 | 9 | 9 |

EXAMPLE 13

A. Preparation of ethylene/2-norbornene/1,4-hexadiene copolymer

An ethylene/2 - norbornene/1,4 - hexadiene copolymer was continuously produced under 400 p.s.i. pressure in tetrachloroethylene as 25° C. in the presence of a coordination catalyst made by mixing disobutyl aluminum monochloride and vanadium tris(acetylacetonate) in the reactor itself. The aluminum: vanadium ratio was 29.4. The residence time was 10.7 minutes.

The following feed rates were maintained:

| | Gram-moles/hr. |
|---|---|
| Ethylene | 4.38 |
| Norbornene | 1.035 |
| 1,4-hexadiene | 0.585 |
| Hydrogen | 0.0024 |
| Vanadium tris(acetylacetonate) | 0.00102 |
| Diisobutyl aluminum monochloride | 0.030 |

The concentration of monomers in the reactor were:

| | Gram-mole/liter |
|---|---|
| Ethylene | 0.100 |
| Norbornene | 0.0391 |
| 1,4-hexadiene | 0.0808 |

Total flow: 6 liters/hour.
Copolymer concentration: 2.11% by weight.

The copolymer prepared by the above procedure contained 39.7 weight percent norbornene, 3.3 weight percent of unsaturated units derived from hexadiene (0.40 gram-mole of C—C double bonds/kg. were present); and 55.9 weight percent ethylene monomer units. The inherent viscosity was 1.34 (0.1 gram copolymer in 100 ml. tetrachloroethylene at 30° C.).

The copolymer prepared above was compounded according to the following recipe:

| Component: | Parts by weight |
|---|---|
| Copolymer | 100 |
| ZnO | 5 |
| Stearic acid | 1 |
| Sulfur | 1.5 |
| Tetramethyl thiuram monosulfide | 1.5 |
| 2-mercaptobenzo thiazole | 0.5 |

The composition was cured for 60 minutes at 160° C. Table IV gives the vulcanizate properties.

TABLE IV.—ETHYLENE-NORBORNENE-1,4-HEXADIENE COPOLYMER GUM VULCANIZATE PROPERTIES

| Wt. percent norbornene | 39.7 |
|---|---|
| Wt. percent unsaturated units | 3.3 |
| Unsatd. moles/kg. | 0.40 |
| $\eta_{inh}$ (0.1% in C₂Cl₂ at 30° C.) | 1.34 |
| Wallace plasticity (212° F.) | 48 |
| ML-4 (212° F.) | 110 |
| S/S Instron, 25° C.: | |
| $M_{100}$ | 200 |
| $M_{200}$ | 250 |
| $M_{300}$ | 400 |
| $M_{400}$ | 1000 |
| $T_B$ | 3200 |
| $E_B$ | 460 |
| Tensile set, percent | 6 |
| Comp. Set B, percent: | |
| 22 hrs. at 77° C. | 9 |
| 70 hrs. at 100° C. | 40 |
| Hardness, Shore A | 54 |
| Resilience, Yerzley: | |
| 25° C. | 69 |
| 100° C. | 81 |
| Bashore, 20° C. | 6 |
| HBU, ⅜₁₆″ stroke, 20 min.: | |
| ΔC, mils | 0 |
| ΔT, °C | 35 |
| FCT, °C | 99 |
| Cond. of center | Dense |
| Time (min. to minimum C) | 20 |

EXAMPLE 14

Preparation of ethylene/2-norbornene/1,4-hexadiene copolymer

The reactor and general procedure described in Example 13 were employed here except as noted.

The monomers were supplied at the following rates in gram-moles per hour: ethylene, 10.95; 2-norbornene, 2.59; 1,4-hexadiene, 1.46. The monomer concentrations in the reactor in moles per liter were as follows: ethylene, 0.700; 2-norbornene 0.320; 1,4-hexadiene, 0.437. Hydrogen was supplied at the rate of 0.040 gram-mole per hour.

The catalyst was made in situ in the reactor by separately introducing vanadium tris(acetylacetonate) and diisobutyl aluminum monochloride at 0.00017 and 0.005 gram-mole respectively, per liter of total flow.

The reactor was operated at 40° C. under a pressure of 400 p.s.i. The total flow was 3 liters per hour. The residence time was 21.3 minutes.

The effluent from the reactor contained 10.9% by weight of an ethylene/2-norbornene/1,4-hexadiene copolymer analyzing as follows: 37.0 wt. percent 2-norbornene; 0.27 gram-mole of carbon-carbon double bonds per kilogram; 2.21 wt. percent butenyl side chains: The copolymer thus had by weight: 60% ethylene, 37% norbornene, and 2.21 weight percent of unsaturated units derived from 1,4-hexadiene. The inherent viscosity was 0.75 (measured on a 0.1 wt. percent solution in tetrachloroethylene at 30° C.).

This copolymer solution is suitable for use in a coating composition to improve the tack of ethylene/propylene 1,4-hexadiene tripolymer as described in Example 1.

EXAMPLES 15-18

Preparation of ethylene/2-norbornene/1,4-hexadiene copolymers

The high pressure apparatus and the general procedure set out above in Example 14 were employed for making four copolymer samples of increasing molecular weight (as shown by increasing inherent viscosities):

| Example: | Inherent viscosity | Percent norbornene by weight |
|---|---|---|
| 15 | 0.6 | 41.6 |
| 16 | 0.8 | 38.5 |
| 17 | 1.2 | 40 |
| 18 | 1.66 | 39.6 |

The copolymers have the following additional characteristics:

| Example | Unsaturation, g.-mole, C=C/kilo | Wt. percent unsaturated units | Wt. percent ethylene | Wallace plasticity |
|---|---|---|---|---|
| 15 | 0.45 | 3.6 | 53.6 | 5.8 |
| 16 | 0.35 | 2.85 | 57.7 | 14.5 |
| 17 | 0.42 | 3.4 | 54.8 | 37 |
| 18 | 0.35 | 2.85 | 56.3 | 82 |

The copolymer of Example 15 was prepared by supplying 6 gram-moles per hour of total monomers distributed as follows: ethylene, 4.38; norbornene, 1.035; 1,4-hexadiene, 0.585. Ten millimoles of hydrogen were supplied each hour. The coordination catalyst was made in situ by separately introducing for every liter of total flow 0.17 millimole of vanadium tris(acetylacetonate) and 5 millimoles of diisobutyl aluminum monochloride (aluminum: vanadium mole ratio=29.4). The reactor was operated at 25° C. under a pressure of 400 p.s.i. for a residence time of 10.7 minutes.

The copolymer of Example 16 was made by supplying 15 gram-moles per hour of total monomers distributed as follows: ethylene, 10.95; norbornene, 2.59; 1,4-hexadiene, 1.46. Twenty-five millimoles of hydrogen were supplied each hour. The catalyst proportions were the same as for making the copolymer of Example 15; the polymerization conditions were the same, too except that the temperature was 40° C.

The copolymer of Example 17 was made the same way as the copolymer of Example 15 except that the hydrogen was supplied at a lower rate (2.4 millimoles per hour) and the temperature in the polymerization reactor was 40° C.

The copolymer of Example 18 was made the same as the copolymer of Example 17 except that the total monomer concentration per liter of total flow was increased to 9 gram-moles per hour, the relative proportions of ethylene, norbornene, and 1,4-hexadiene remaining as before.

The copolymers prepared above were individually compounded with 50 parts per hundred carbon black. One set of samples had high abrasion furnace black; the other had super abrasion furnace black.

Samples were then tested for tack using the fast break test. The following data were obtained:

Contact time (sec.): 1 2 4 1
Contact pressure (lbs.): 10 10 10 20

| Example: | Carbon black | Inherent viscosity | Breaking force (lbs.) | | | |
|---|---|---|---|---|---|---|
| 15 | SAF | 0.6 | 3.1 | 2.8 | 4.4 | 2.8 |
| 15 | HAF | 0.6 | 2.8 | 2.8 | 3 | 2.6 |
| 16 | SAF | 1.8 | 18 | 23 | 29 | 25 |
| 16 | HAF | 1.8 | 23 | 26 | 30 | 23 |
| 17 | SAF | 1.2 | 19 | 23 | 27 | 21 |
| 17 | HAF | 1.2 | 21 | 20 | 24 | 22 |
| 18 | SAF | 1.66 | 17 | 15 | 24 | 16 |
| 18 | HAF | 1.66 | 5.2 | 5.6 | 6 | 5.2 |

EXAMPLE 19

The copolymers described in Examples 3–12 were each compounded with 50 parts per 100 of high abrasion furnace black and 50 parts of naphthenic petroleum oil. 1.0 x 0.5 inch test samples were prepared and their tack determined by the fast break test. The results are given in the following table.

Contact time (sec.): 1 2 4 1
Contact Pressure (lbs.): 10 10 10 20

| Sample: | Weight norbornene | Breaking force (lbs.) | | | |
|---|---|---|---|---|---|
| A | 26.8 | 1 | 1 | 1 | 1 |
| B | 34 | 4 | 9 | 16 | 15 |
| C | 36.5 | 11 | 20 | 26 | 21 |
| D | 38.5 | 26 | 30 | 35 | 26 |
| E | 40.0 | 28 | 29 | 30 | 22 |
| F | 44 | 22 | 27 | 27 | 22 |
| G | 41 | 17 | 27 | 36 | 27 |
| H | 46.5 | 3 | 24 | 24 | 17 |

We claim:
1. A linear statistical copolymer consisting essentially of
(I) from 30 to 45 weight percent of units having the formula:

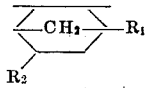

said units being derived from a norbornene having the formula:

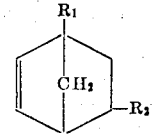

wherein $R_1$ and $R_2$ are hydrogen alkyl groups having from 1 to 4 carbon atoms.
(II) from 2 to 15% by weight of unsaturated units derived from a non-conjugated aliphatic diene having at least one double bond which is polymerizable with an anionic catalyst.

(III) the balance of said copolymer being units derived from a straight chain α-olefin having from 2 to 4 carbon atoms and optionally minor amounts of other polymerizable α-olefins having from 5 to 18 carbon atoms, said copolymers having an inherent viscosity, measured on an 0.1% by weight solution in tetrachloroethylene at 30° C. of from 0.5 to 2.0.

2. Composition of claim 1 wherein $R_1$ and $R_2$ are hydrogen.

3. Composition of claim 2 wherein the said α-olefin is ethylene.

4. Composition of claim 3 wherein the aliphatic diene is 1,4-hexadiene.

5. An elastomer comprising of the cured copolymer of claim 1.

6. An elastomer comprising the cured copolymer of claim 2.

7. An elastomer comprising the cured copolymer of claim 3.

8. An elastomer comprising the cured copolymer of claim 4.

9. A method for tacking uncured elastomeric articles of sulfur-curable α-olefin copolymers which comprises solution coating the surfaces of the articles to be tacked with a solution of a tackifying copolymer in an inert organic solvent together with compounding ingredients equivalent to those employed in compounding the said articles, drying the said coating, and contacting the coated surfaces of said articles with each other, said tackifying copolymer consisting essentially of (I) from 30 to 45% by weight of units having the formula:

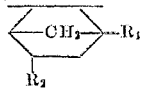

said units being derived from a norbornene having the formula:

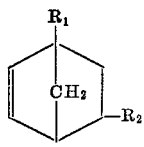

where $R_1$ and $R_2$ are hydrogen or alkyl groups having from 1 to 4 carbon atoms.

(II) from 2 to 15% by weight of unsaturated units derived from a non-conjugated aliphatic diene having at least one double bond polymerized with an anionic catalyst.

(III) the balance of said copolymers being units derived from a straight chain α-olefin having from 2 to 4 carbon atoms, and optionally minor amounts of other polymerizable α-olefins having from 5 to 18 carbon atoms, said tackifying copolymers having an inherent viscosity measured as on 0.1% solution in tetrachloroethylene of from 0.5 to 2.0.

10. Process of claim 9 wherein said articles are made of a compounded elastomeric copolymer of ethylene, propylene and 1,4-hexadiene.

11. Process of claim 9 wherein said solution contains from 5 to 50% by weight of total non-volatile ingredients.

12. Process of claim 11 wherein each article is coated with from 5 to 35 milligrams per square inch of compounded tackifying copolymer.

13. Process of claim 12 wherein the tackifying copolymer is a copolymer of ethylene, norbornene, and 1,4-hexadiene.

References Cited
UNITED STATES PATENTS 2,799,668    7/1957    Anderson      260—88.1
3,380,952    4/1968    Cluff et al.      260—33.8

JOSEPH L. SCHOFER, Primary Examiner

ROGER S. BENJAMIN, Assistant Examiner

U.S. Cl. X.R.

156—334

PO-1050
(5/69)

UNITED STATES PATENT OFFICE
CERTIFICATE OF CORRECTION

Patent No. 3,467,633　　　　　　　　Dated SEPTEMBER 16, 1969

Inventor(s) HARRIS & KING

It is certified that error appears in the above-identified patent and that said Letters Patent are hereby corrected as shown below:

In Claim 1, Col. 16, line 72: delete "hydrogen alkyl groups" and insert therefor -- hydrogen or alkyl groups --.

SIGNED AND
SEALED

DEC 23 1969

(SEAL)
Attest:

Edward M. Fletcher, Jr.
Attesting Officer

WILLIAM E. SCHUYLER, JR.
Commissioner of Patents